UNITED STATES PATENT OFFICE.

HIRAM JOHNSON, OF FARMERSVILLE, NEW YORK.

IMPROVEMENT IN TANNING.

Specification forming part of Letters Patent No. 23,471, dated April 5, 1859.

*To all whom it may concern:*

Be it known that I, HIRAM JOHNSON, of the town of Farmersville, county of Cattaraugus, and State of New York, have invented a valuable Improvement for Converting Hides and Skins into Leather, of which the following is a specification.

The nature of my invention consists in compounding or mixing quicklime or its solution in water with tannic acids.

To enable others skilled in the art to properly compound and use my invention, I will proceed to describe my manner of proceeding.

The hides and skins are first placed in lime and water, and after remaining the usual time are removed and unhaired and fleshed in the ordinary way. I now wash them thoroughly in water and beam them, when, without baiting, they are ready to be immersed in the tannic liquor, prepared as follows: To fifty gallons of pure water I add one bushel of quicklime, letting it stand till the lime settles, leaving the water perfectly clear. I then compound the following ingredients: eight pounds of catechu, three pounds of sulphate of alumina and potassa, and one and one-half pound of chloride of sodium. I now place the lime-water, drawn clear from the lime, in a vessel and bring it to a boiling-heat, when I add the above compound, stirring the same briskly till the whole is thoroughly blended. The liquid is now ready for the vat, where it should cool to a temperature of about 75° of heat, into which I then immerse the hides or skins prepared for the tan, handling them frequently until thoroughly colored, when I let them remain till sufficiently tanned, which for sheep or calf skins is from one to three days and for heavy hides from six to thirty days.

I wish to be understood as not claiming the use of lime in any of the preparations of the skins previous to their immersion in the tannic acid.

I do not claim broadly the use of tannate of lime to be used in the vats, for such has been described and claimed by Obadiah Rich in a patent dated the 9th day of December, 1856; but

What I claim as my particular invention, and desire to secure by Letters Patent, is—

The use of a solution of quicklime as a tanning ingredient, to be used in connection with any of the tannic acids or tanning ingredients now in general use, not confining myself, however, to the exact proportions as above specified.

New York, September 4, 1858.

HIRAM JOHNSON.

Witnesses:
   LLOYD SLADE,
   S. M. SLADE.